(12) United States Patent
Rodgers et al.

(10) Patent No.: US 7,797,551 B2
(45) Date of Patent: *Sep. 14, 2010

(54) SECURE VERIFICATION USING A SET-TOP-BOX CHIP

(75) Inventors: Steve Rodgers, San Diego, CA (US); Shermin (Xuemin) Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/245,873

(22) Filed: Oct. 6, 2008

(65) Prior Publication Data

US 2009/0037726 A1    Feb. 5, 2009

Related U.S. Application Data

(63) Continuation of application No. 10/702,326, filed on Nov. 6, 2003, now Pat. No. 7,434,065.

(60) Provisional application No. 60/506,894, filed on Sep. 29, 2003.

(51) Int. Cl.
    *G06F 12/14*     (2006.01)

(52) U.S. Cl. .......................................... 713/189; 726/26

(58) Field of Classification Search ........................ None
See application file for complete search history.

(56) References Cited

U.S. PATENT DOCUMENTS

| 4,712,239 | A | 12/1987 | Frezza et al. |
| 6,507,907 | B1 | 1/2003 | Takahashi et al. |
| 6,550,008 | B1 * | 4/2003 | Zhang et al. ............... 713/155 |
| 7,131,004 | B1 * | 10/2006 | Lyle ........................ 713/169 |

FOREIGN PATENT DOCUMENTS

| DE | 102 16 396 A1 | 10/2003 |
| EP | 0 506 637 A2 | 9/1992 |
| GB | 2 377 348 A | 1/2003 |

* cited by examiner

*Primary Examiner*—Brandon S Hoffman
(74) *Attorney, Agent, or Firm*—McAndrews, Held & Malloy, Ltd.

(57) ABSTRACT

One or more methods and systems of authenticating or verifying a set-top-box chip in a set-top-box are presented. In one embodiment, a set-top-box incorporates a set-top-box chip used to decode or decrypt media content provided by a cable television operator or carrier. The set-top-box chip incorporates a decryption circuitry, a compare circuitry, a hash function circuitry, a key generation circuitry, a back channel return circuitry, a linear feedback shift register, a timer reset circuitry, a modify enable status circuitry, a one time programmable memory, and a non-volatile memory. The cable TV carrier validates a set-top-box chip used in a set-top-box by way of a verification sequence that requires a successful verification by the set-top-box chip.

66 Claims, 3 Drawing Sheets

SECURE VERIFICATION USING A SET-TOP-BOX CHIP

RELATED APPLICATION/INCORPORATION BY REFERENCE

This Application is a continuation of U.S. patent application Ser. No. 10/702,326, filed on Nov. 6, 2003, now U.S. Pat. No. 7,434,065, which makes reference to and claims priority from U.S. Provisional Patent Application Ser. No. 60/506,894, entitled "SECURE VERIFICATION USING A SET-TOP-BOX CHIP", filed on Sep. 29, 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Cable television carriers, satellite operators, or content providers have distributed media or content material to paid subscribers using set-top-boxes. The ultimate goal of security features on a set-top-box chip ("STBC") of a set-top-box, is to prevent an unauthorized entity from receiving or distributing material originating from a content provider. Modern STBCs have employed many security features which are intended to prevent such an occurrence, most of which are based on an on-chip one time programmable memory (OTP memory). The OTP memory may be used to store keys for decrypting one or more encrypted sequences received by the set-top-box. The use of these OTP memories allows the storage of keys that are unique to a set-top-box. These keys are used for decrypting or decoding encrypted data sequences received from a cable TV operator. Because each set-top-box is associated with unique keys that are burned into an OTP memory, access to a single OTP memory of a set-top-box chip will not compromise other set-top-boxes within a network.

However, an unauthorized entity may overcome the security provided by using such one time programming memories. If an unauthorized entity obtains a large number of new unprogrammed OTP memory chips, he only needs to obtain a single authorized OTP key to be able to program all OTP memory chips. Once obtained, the unauthorized entity may program all OTP memories using the authorized key, allowing him to sell the set-top boxes and earn a sizeable profit. The unauthorized entity may continue to sell such unauthorized set-top-boxes, thereby undercutting the sales revenue of the authorized content provider. Since the set-top-boxes are all programmed with the authorized key, they will all respond in the same fashion as the set-top-box containing the original authorized key.

In another instance, an original database of OTP keys may be compromised. Should an unauthorized entity hack or decipher the OTP keys in one or more STBCs, he may be able to recover original content from a content provider by deducing additional information about the encryption mechanism used by the STBC. This may be accomplished by legitimately subscribing service for one set-top-box while leaving the other unauthorized boxes unsubscribed. Since the OTP keys of all set-top-boxes are known, the unauthorized entity may implement circuitry within the unauthorized set-top-boxes to allow the decryption of one or more encrypted keys by way of knowledge obtained from operation of the authorized set-top-box. Of course, the encryption methodology may be implemented by reversing the steps used in the decryption process. As a result, the unauthorized set-top-boxes may be able to illegitimately obtain content provided by the cable television carrier, satellite operator, or content provider.

A content provider may implement a methodology in which a verification sequence must be sent from the content provider before a set-top-box is initialized allowing the content to be correctly displayed to an end-user. The content provider may update a database at its head-end, for example, related to the set-top-boxes that have been initialized and enabled for use. As a result, the use of one or more additional STBCs programmed with an identical OPT key may not be productive for a hacker since the content provider will only enable the first set-top-box using a particular OTP key. However, if an unauthorized entity legitimately subscribes to a set-top-box, he may monitor a verification sequence transmitted to his set-top-box when the set-top-box is first enabled. After obtaining the verification sequence, the unauthorized entity may use the sequence to enable his own illegitimate set-top-boxes (using the same OTP key) by using the same sequence at another time. The unauthorized entity may also use the sequence to deduce additional information about the original unencrypted sequence by decrypting the sequence using the known OTP key. As a consequence, it may be possible to authorize illegitimate set-top-boxes by issuing verification sequences to these illegitimate set-top-boxes without being activated by the head-end. The unauthorized entity acts as a head-end in this instance.

In another instance, an unauthorized entity does not monitor a verification sequence transmitted by a content provider. Instead he fabricates cloned set-top-boxes prior to the first set-top-box being enabled. The unauthorized entity schedules an initialization of all unauthorized set-top-boxes by powering up and receiving the initial verification sequence transmitted by the content provider. Hence, all unauthorized set-top-boxes may be enabled simultaneously.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system and method to verify the authenticity of a set-top-box chip (STBC) or set-top-box integrated circuit used in a set-top-box (STB).

In one embodiment, the method of verifying the authenticity of a set-top-box chip involves receiving a verification sequence from a head-end verification device, generating an encryption key, decrypting the verification sequence using the encryption key to generate a first hashed data sequence, generating a second hashed data sequence, and determining if the first hashed data sequence is equal to the second hashed data sequence. In one embodiment, the second hashed data sequence is a hash function of one or more parameters stored in the set-top-box chip. The parameters include a constant and an output from a linear feedback shift register. In one embodiment, the method incorporates transmitting a re-synchronization request to the head-end verification device in order to reactivate the set-top-box chip. In another embodiment, the method includes initializing a linear feedback shift register using an initialization seed that is unique to each set-top-box chip.

In one embodiment, the system for allowing a cable TV head-end to verify the authenticity of a set-top-box chip incorporates a decryption circuitry for generating a first hashed sequence from a verification sequence transmitted by the cable TV head-end, a hash function circuitry for implementing a hashing function for generating a second hashed sequence, an encryption key generating function circuitry, a linear feedback shift register, a one time programmable memory for storing one or more keys, a non-volatile memory for storing an output of the linear feedback shift register, a timer value, and an enable status indicator. In addition, a return channel circuitry for transmitting a re-synchronization request and a compare circuitry for comparing the first hashed sequence with the second hashed sequence is used.

These and other advantages, aspects, and novel features of the present invention, as well as details of illustrated embodiments, thereof will be more fully understood from the following description and drawings.

DETAILED DESCRIPTION OF THE INVENTION

Aspects of the present invention may be found in a system and method to verify the authenticity of a set-top-box chip (STBC) or integrated circuit used in a set-top-box (STB). The one or more methods and systems used may prevent unauthorized replication and operation of set-top-boxes by one or more unauthorized entities. The set-top-boxes incorporate a set-top-box chip used to decode or decrypt media content provided by a cable television carrier, satellite operator or content provider. The cable TV carrier validates a STBC in a STB by way of a verification sequence that requires a successful verification by the STBC.

Figure 1:
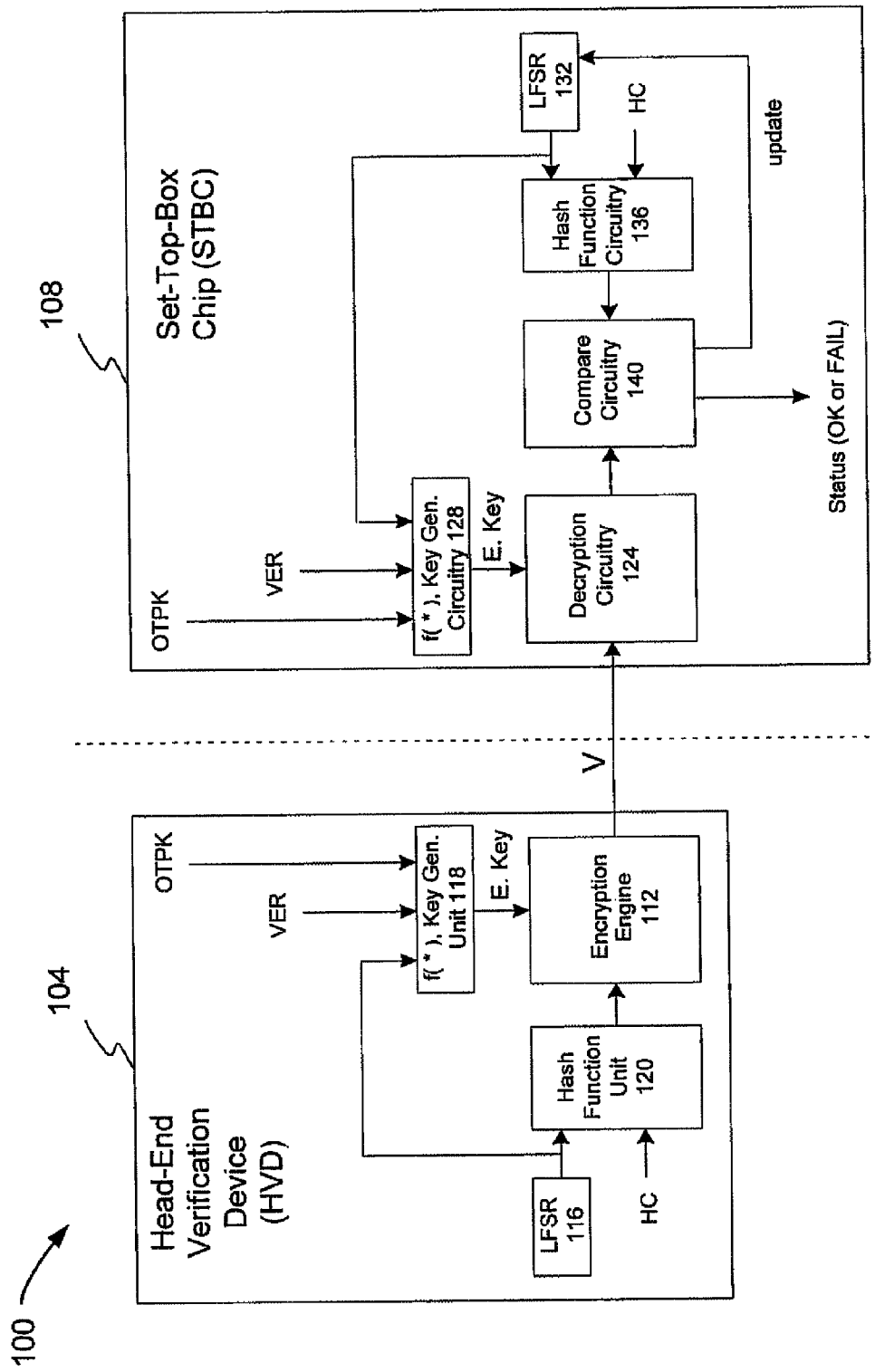
FIG. 1 is a block diagram of a set-top-box (STB) verification system utilizing a set-top-box chip (STBC) in accordance with an embodiment of the present invention.

FIG. 1 is a block diagram of a set-top-box (STB) verification system 100 utilizing a set-top-box chip (STBC) 108 in accordance with an embodiment of the present invention. The STB verification system comprises a head-end verification device (HVD) 104 communicatively coupled to one or more set-top-boxes (STBs). For purposes of illustration, the STB verification system 100 displays a HVD 104 communicating with a single STBC 108 The STBC 108 resides as hardware within a typical set-top-box (STB). The HVD may comprise a combination of hardware and/or software used to generate a verification sequence, V, that is transmitted to the STBC 108. The HVD 104 may comprise a computing device such as a desktop computer capable of storing software. The HVD 104 may comprise a processor, a main processor memory, and a storage device such as a hard disk drive. The software may comprise one or more databases and software applications used during the verification of a STBC 108. The HVD 104 resides within a head-end or control center of a cable television carrier.

Operationally, the HVD 104 generates a verification sequence, V, through a number of steps. As illustrated in FIG. 1, an encryption key is used in combination with a hashed output to generate the verification sequence, V. The encryption key is generated by an encryption engine 112 of the HVD 104. The encryption engine 112 may comprise an encryption circuitry or software employing a 3DES or AES encryption function. The encryption engine 112 receives as inputs an encryption key and a first hashed data sequence. The encryption key is a function of a word, which may be described herein as a verifier word (VER), a key, which may be described herein as a one time programmable key (OTPK), and an output, LF, from a linear shift register (LFSR) 116. The output, LF, from the LFSR 116 is incremented such that the verification sequence, V, changes after each successful verification. As a consequence, the same verification sequence, V, is not continuously used to re-enable the same STB, The VER and OTPK parameters may be stored within one or more secured databases within one or more storage devices in the cable TV head-end. It is contemplated that the VER and OTPK (parameters may comprise unique values corresponding to each authorized STBC manufactured by a STBC manufacturer. As shown, the encryption key is implemented by a key generation unit 118 employing a key generation function, $f(*)$. The key generation unit 118 may comprise hardware and/or software. The key generation unit may be implemented by way of execution of software instructions or an application residing in the HVD 104. The first hashed data sequence is a function of a hashing function. The hashing function is implemented by a hash function unit 120 pictured in FIG. 1. As illustrated, the hash function unit 120 receives inputs provided by the LFSR 116 and a constant, alternatively described herein as a hidden constant (HC). The hash function unit 120 may comprise hardware and/or software and may be implemented by way of execution of software instructions residing within the HVD 104.

The verification sequence may be expressed as a function of the following variables or parameters:

$V=E\{f(VER,OTPK,LF), f(HC,LF)\}$ where VER is the verifier word, OTPK is the one time programmable key, LF is the LFSR output, and HC is the hidden constant. That is, the verification sequence sent to the STB is a function of two functions. The encryption key, $f(VER,OTPK,LF)$, is a function of VER, OTPK, and LF, while the unencrypted data, $f(HC,LF)$, is a function of HC and LF. The verifier word, VER, comprises at least 64 bits.

A hash function is used to scramble an LFSR output. The hash function may be a SHA-1 or any other type of function which can securely obscure the original contents.

Once the verification sequence, V, is received by the STBC 108, the verification sequence is decrypted by a decryption circuitry 124. The decryption circuitry 124 may comprise a circuitry implementing the 3DES or AES encryption technique allowing the verification sequence, V, to be correctly decrypted at the STBC 108. In order to decrypt the verification sequence, V, the decryption circuitry 124 receives an input provided by a key generation circuitry 128 employing the same function, f(*), previously described in reference to the HVD 104. The encryption key is a function of the verifier word (VER), the one time programmable key (OTPK), and the output, LF, from a linear shift register (LFSR) 132. By incorporating the encryption key, the decryption circuitry 124 recovers the first hashed data sequence previously generated at the HVD 104. A hash function circuitry 136 generates a second hashed data sequence. The hash function circuitry 136 uses as inputs the output from the LFSR 132 and a constant or hidden constant (HC). In one embodiment, the hidden constant (HC) is generated utilizing of one or more programmable parameters stored within the STBC. The same programmable parameters are implemented at the HVD 104 in order to generate the same hidden constant during the encryption process. As a consequence, the HCs for a number of STBCs may be stored within the head-end's HVD 104 for use by the encryption engine 112. In one embodiment, the hidden constant (HC) is determined by the STBC manufacturer, while the cable TV carrier, satellite operator, or content provider determines the OTPK, VER, and the LF values, The hidden constant may be modified using programmable parameters in a manner known only to the STBC manufacturer. The STBC manufacturer may implement the programmable parameters by way of hardware and/or software located in the STBC and the HVD 104. In one embodiment, the programmable parameters may vary based on one or more initial values provided by the STBC manufacturer. Thus, if one or more OTPK, VER, or LF databases within the HVD 104 is compromised by a hacker or unauthorized person, it will be possible to maintain security by modifying the hidden constant by using an implementation and/or database of initial values known only by the STBC manufacturer.

The compare circuitry 140 compares the recovered first hashed data sequence to the second hashed data sequence if the first hashed data sequence is equal to the second hashed data sequence, the compare circuitry 140 outputs a status indicator signal The status indicator signal may generate a human readable message that is displayed on an exemplary LED located within the set-top-box (STB). For example, the status indicator signal may generate the words "OK" if the first hashed data sequence is equal to the second hashed data sequence; otherwise, the status indicator signal may generate the word "FAIL".

Figure 2:
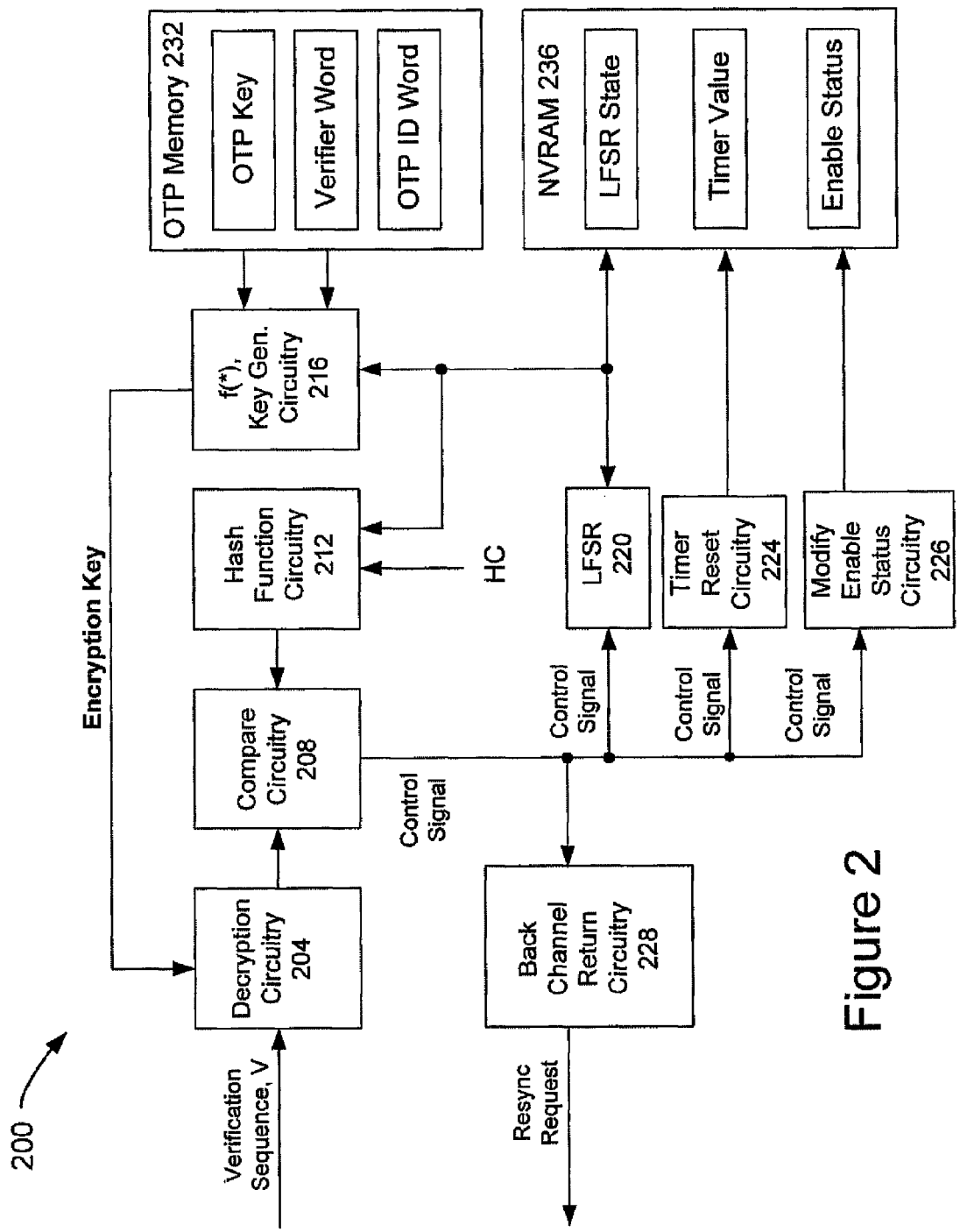
FIG. 2 is a detailed block diagram of a set-top-box chip (STBC) in accordance with an embodiment of the invention.

FIG. 2 is a detailed block diagram of a set-top-box chip (STBC) 200 in accordance with an embodiment of the invention. The STBC 200 comprises a decryption circuitry 204, a compare circuitry 208, a hash function circuitry 212, an encryption key generation circuitry 216, a linear feedback shift register (LFSR) 220, a timer reset circuitry 224, a modify enable status circuitry 226, a back channel return circuitry 228, a one time programmable memory (OTP Memory) 232, and a non-volatile random access memory (NVRAM) 236. The decryption circuitry 204 receives a verification sequence, V, transmitted by a head-end The verification sequence, V, is generated by a head-end verification device (HVD) as described in relation to FIG. 1. The decryption circuitry 204 uses an encryption key provided by the key generation circuitry 216 in order to decrypt the verification sequence, V. The decryption circuitry outputs a recovered first hashed data sequence that was previously encrypted by the encryption engine of the HVD. The recovered first hashed data sequence is input into the compare circuitry 208. The hash function circuitry 212 generates a second hashed data sequence that is provided as an input to the compare circuitry 208. The hash function output is a function of a constant (termed a hidden constant (HC) since it is modified only by a set-top-box chip manufacturer) and the output of the LFSR 220. The compare circuitry 208 compares the first hashed data sequence to the second hashed data sequence. If the first hashed data sequence is equal to the second hashed data sequence, the compare circuitry 208 generates a control signal to the timer reset circuitry 224. As a result, the timer reset circuitry 224 may reset a timer value stored within the non-volatile random access memory 236. The timer value corresponds to the amount of time remaining before the STBC disables itself. The timer value may be set to any value desired by a cable TV carrier. The value should exceed the time between successive resets. In the event the first hashed data sequence is not equal to the second hashed data sequence, the compare circuitry may output a control signal that inhibits resetting of the timer value stored in the NVRAM 236. In another embodiment, the head-end verification device may determine that the STBC receiving and reading the verification sequences is unauthorized for use, when one or more verification sequences do not permit resetting of the timer value in the NVRAM 236. In this instance, the back channel return circuitry 228 may be used by the head-end verification device as a mechanism to communicate with the STBC and subsequently disable the STBC. As shown in FIG. 2, the OTP key (OTPK), verifier word (VER), and OTP ID word (OTPID) is stored in the OTP memory 232 of the set-top-box chip. OTPK, VER, and OTPID may be burned into the OTP memory 232 during the set-top-box manufacturing process by the set-top-box chip manufacturer.

When a verification sequence is sent by the head-end, the head-end verification device (HVD) automatically increments its LFSR. When the verification sequence is received by the appropriate STBC 200, the STBC 200 generates a control signal to increment the LFSR 220 to its next state if verification is successful (i.e., the resulting first hashed data sequence equals the second hashed sequence). As a result of this approach, the next verification sequence transmitted by the HVD to the STBC 200 will be different. In summary, periodic changing of the verification sequence poses a significant deterrent to a hacker. Of course, a hacker may find it more difficult to crack and decipher verification sequences that are continuously changing. The control signal generated by the compare circuitry 208 is input to the modify enable status circuitry 226. When a successful verification is performed, the modify enable status circuitry 226 modifies an enable status register or location within the NVRAM 236 to indicate that the STBC 200 is enabled. The one or more values (i.e., LFSR state (or LF), timer value, and enable status) stored within the NVRAM 236 will not be lost in the event of power loss to the STBC 200. Because the memory is non-volatile, these values will remain when power is restored to the STB. This incident may occur, for example, when the STB is inadvertently unplugged or if there is a power failure.

The STBC 200 is able to monitor all verification sequences that are sent by the HVD in order to synchronize itself with respect to the current LFSR 220 state. If the STBC 200 is unable to monitor an incoming verification sequence, then it will not be able to transition to its next state and the LFSR 220 states between the HVD and the STBC 200 will differ. Unless this is resolved, the STBC 200 will not be able to reset its timer, as a consequence, the STBC 200 will be disabled in due course. As a result, the STBC will disable itself without any intervention from the head-end.

Of course, if the STBC 200 is operational, this should not be an issue. However, since the verification sequence may be sent while the box is unplugged, or when the STBC 200 suffers a power outage, there needs to be a method for re-synchronizing the HDV with the STBC's LFSR 200. This is accomplished, for example, by the back channel return circuitry 228. The back channel return circuitry 228 may be automatically triggered whenever a verification sequence is not successfully decrypted by the STBC. In such an instance, the STBC 200 loads the previous value of its LFSR 220 state (so as not to expose its current value) from its NVRAM 236, passes it through the hash function circuitry 212, encrypts it using the verifier word (VER), then sends it to the HVD, which receives it, and re-synchronizes its LFSR state to the value that matches the STBC.

The back channel re-synchronizing capability may present itself as a vulnerability to a hacker, since it may allow a hacker to re-synchronize an LFSR state for a particular box. However, consider a hacker that has cloned multiple boxes using the same OTPK and the same LFSR initialization state. As soon as a single cloned box requests resynchronization as a result of being unplugged, or due to a power outage, the LFSR state of the HVD for that particular OTPK will cause all other cloned boxes to fail when the new verification sequence is sent. When this happens, all cloned boxes (minus the one STBC that initially lost power) will request re-synchronization. This will then cause the first box to fail again, resulting in an additional re-synchronization request. This results in an unstable state. After multiple requests from the same STBC, the head-end may determine that one or more STBs have been compromised, one or more commands and/or messages may be generated indicating that the one or more cloned STBs are unauthorized.

In the case where multiple, unauthorized STBs with unauthorized OTPKs are being used, it will not be possible for the cloned box to request re-synchronization, because the head-end verification device (HVD) will only recognize requests from authorized OTPKs, Since the request for re-synchronization may involve elements of the OTPID word and OTPK, it will be very easy for the head-end to determine that the request is coming from an unauthorized source. The head-end may subsequently disable the unauthorized boxes manually, or simply allow their timers to expire.

In one embodiment, a STBC is designed without a back channel return circuitry 228. In this embodiment, the technique used may be modified to minimize the occurrence of an authorized box getting out of sync with the head-end verification device. There are two methods to accomplish this. In one embodiment, the method employs transmitting a verification sequence multiple times until the STBC resets its timer. For example, the transmitted verification sequence may have a type of encoded identification code such that the STB only increments the LFSR once for a given identification code, and also only resets its timer once for a given identification code. If identical verification sequences containing the same identification code are received, no further action would be taken until the identification code is changed. This allows the head-end to send the same verification sequence multiple times while only incrementing the LFSR state once. This technique takes into consideration the possibility of loss of power when a user powers down a device or when a power outage occurs. If the same verification sequence (with identification code) is sent over a period of several weeks, the chances that the STB will be unplugged longer than the period in which the verification sequence is sent becomes very small.

In another embodiment, a "windowing" capability is deployed for the LFSR in the STBC. In the event a verification sequence is missed, the STBC has the capability of incrementing its LFSR state by one or more states before trying to decode the verification sequence again. In this embodiment, the LFSR may continue to decode the verification sequence over some small number of incremental states. For example, the incremental states may comprise a "window" that may be set equal to a relatively small number such as the value 3. Setting the "window" to size of value 3 is analogous to allowing the STBC to miss three verification sequences Alternatively, if a new verification sequence is sent every week, setting a three week "window" will allow recovery via re-synchronization if the STB is unplugged for 3 consecutive weeks (or unplugged one time each week at the exact instance that the verification sequence is sent, which is very unlikely).

Figure 3:
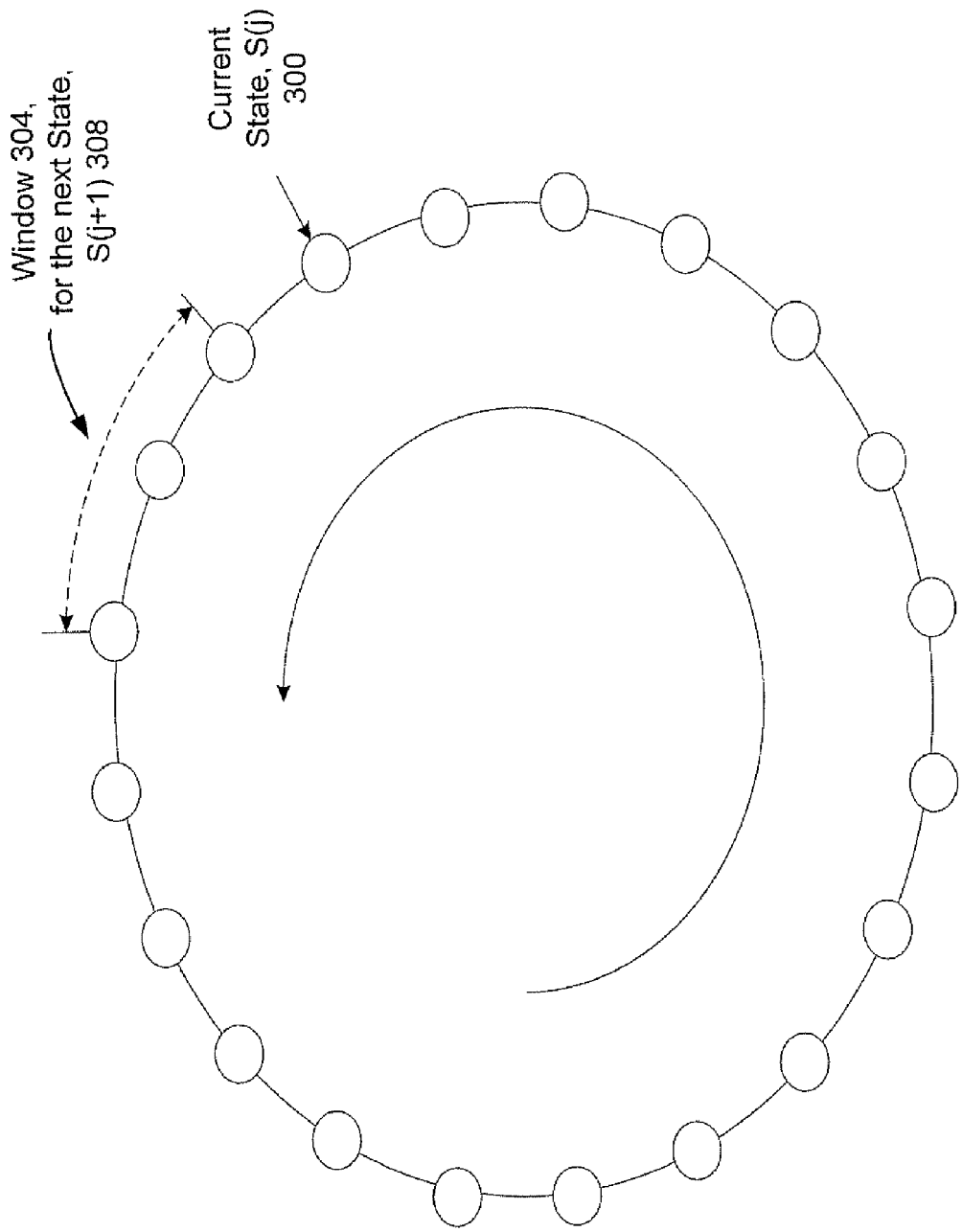
FIG. 3 is a relational block diagram illustrating successive linear feedback shift register (LFSR) states used in re-synchronizing a set-top-box chip to a head-end verification device in accordance with an embodiment of the invention.

FIG. 3 is a relational block diagram illustrating successive LFSR states used in re-synchronizing a set-top-box chip to a head-end verification device in accordance with an embodiment of the invention. The current state 300 is indicated as state S(j). The next state S(j+1) 308 is indicated by the "window" 304 shown. In this example, the "window" 304 comprises the next 3 possible states. The STBC may successively attempt to re-synchronize to the HVD using any one of the next three LFSR states.

Since the chances of getting out of sync with the head-end are minimal with either of these techniques, a back channel return circuitry may not be needed to re-synchronize. In the event that the box is unplugged longer than the periodicity of transmission of a verification sequence, the user may phone a customer service center of the cable TV carrier to request a re-synchronization of their STBC. For example, the customer service center may provide a user a verification sequence to re-synchronize their STBC.

Periodic verification also ensures that even if a hacker manages to successfully bypass the verification sequence one time, his chip will only be enabled for a limited period of time before becoming disabled again. Based on the information it receives from an STBC, a head-end may be able to manually disable a STB that it knows has been compromised. Even if the HVD does not have this information, the STBC will be disabled since it is not configured to receive a verification sequence properly.

Just before a set-top-box is shipped, a unique initial LFSR seed value may be programmed into its NVRAM, so that every STBC will start its LFSR from a different state. Thus, even if the LFSR configuration is deciphered by an unauthorized entity, it will not be possible to determine the LFSR state, since the initial LFSR seed value is not known. Because each STBC is initialized with a unique LFSR seed, a hacker cannot enable multiple STBs using the same verification sequence transmitted by a head-end. Note that the NVRAM contains sensitive data and the STBC should be configured such that access to the NVRAM is obviated. For example, one should ensure that the NVRAM contents cannot be accessed by a processor (CPU) or any other process, such as a built-in-self-test (BIST) or scan test.

The one time programmable key (OPTK) uniquely corresponds to an identifier word termed a one time programmable identification word (OTPID word) while the verifier word (VER) uniquely corresponds with the OPTID word. It is contemplated that these unique correspondences or mappings are stored as two independent and separate databases. Furthermore, the LFSR seed or initialization value uniquely corresponds to the identifier word; as a result, it is contemplated that the LFSR seeds are mapped to OTPID words are separately stored as its own database. Because these three mappings may be stored individually as separate databases, it is possible for them to be stored as data files in separate computing devices. Of course, the computing devices may be located separately, and a cable TV carrier may employ one or more security measures to allow only authorized personnel access to these computing devices and/or databases. This eliminates the possibility that a hacked database, such as a hacked OTPK database, could compromise the verification process since a number of separately located databases are used in the verification process. In summary, knowledge of all three databases is required to successfully verify the chip.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A media device chip comprising:
one or more circuits operable for, at least:
first generating a first hashed data sequence from a received verification sequence;
implementing a hashing function for generating a second hashed data sequence;
second generating a first encryption key which is a function of an output generated by a first linear feedback shift register;
first storing a second key, a word, and an identifier word into a one time programmable memory;
second storing an output of said first linear feedback shift register, a timer value, and an enable status indicator into a non-volatile memory;
synchronizing said first linear feedback shift register to a second linear feedback shift register;
comparing said first hashed data sequence with said second hashed data sequence; and
generating a control signal for incrementing the state of said first linear feedback shift register and enabling operation of said media device chip if said first hashed data sequence is equal to said second hashed data sequence, said word comprising at least 64 bits.

2. The media device chip of claim 1 wherein said hashing function is a function of a constant and said output of said first linear feedback shift register.

3. The media device chip of claim 1 wherein said second key uniquely corresponds to said identifier word.

4. The media device chip of claim 1 wherein said word uniquely corresponds to said identifier word.

5. The media device chip of claim 1 wherein said linear feedback shift register is incremented to one or more successive states before said synchronizing occurs.

6. The media device chip of claim 1 wherein said verification sequence contains an identification code used to increment the state of said linear feedback shift register.

7. The media device chip of claim 1 wherein said second linear feedback shift register resides in a head-end at a cable television carrier.

8. The media device chip of claim 1 wherein said second key is mapped to a one time programmable identification word, wherein said second key is stored in a first database while said one time programmable identification word is stored in a second database.

9. The media device chip of claim 8 wherein said first database is stored in a first computing device while said second database is stored in a second computing device.

10. The media device chip of claim 2 wherein said constant is generated using one or more programmable parameters stored in said media device chip.

11. The media device chip of claim 10 wherein said one or more programmable parameters are stored in a head-end at a cable television carrier.

12. The media device chip of claim 11 wherein said constant may be modified by a media device manufacturer using said one or more programmable parameters.

13. The media device chip of claim 1 wherein said first generating employs 3DES encryption.

14. The media device chip of claim 1 wherein said first generating employs AES encryption.

15. The media device chip of claim 1 wherein said control signal is used for resetting a timer value stored within said media device chip.

16. The media device chip of claim 15 wherein said media device chip is disabled when said timer value reaches zero.

17. The media device chip of claim 15 wherein said control signal inhibits resetting of said timer value whenever said first hashed sequence is not equal to said second hashed sequence.

18. The media device chip of claim 1 wherein said control signal is used for modifying contents of a register to enable or disable said media device chip.

19. The media device chip of claim 1 wherein said control signal is used for synchronizing between said media device chip and a head-end.

20. The media device chip of claim 1 wherein said control signal is used to synchronize said second linear feedback shift register to the same state of said first linear feedback shift register.

21. A media device chip comprising:
at least one processor operable for, at least:
first generating a first hashed data sequence from a received verification sequence;
implementing a hashing function for generating a second hashed data sequence;
second generating a first encryption key which is a function of an output generated by a first linear feedback shift register;
first storing a second key, a word, and an identifier word into a one time programmable memory;
second storing an output of said first linear feedback shift register, a timer value, and an enable status indicator into a non-volatile memory;
synchronizing said first linear feedback shift register to a second linear feedback shift register;
comparing said first hashed data sequence with said second hashed data sequence; and
generating a control signal for incrementing the state of said first linear feedback shift register and enabling operation of said media device chip if said first hashed data sequence is equal to said second hashed data sequence, said word comprising at least 64 bits.

22. The media device chip of claim 21 wherein said hashing function is a function of a constant and said output of said first linear feedback shift register.

23. The media device chip of claim 21 wherein said second key uniquely corresponds to said identifier word.

24. The media device chip of claim 21 wherein said word uniquely corresponds to said identifier word.

25. The media device chip of claim 21 wherein said linear feedback shift register is incremented to one or more successive states before said synchronizing occurs.

26. The media device chip of claim 21 wherein said verification sequence contains an identification code used to increment the state of said linear feedback shift register.

27. The media device chip of claim 21 wherein said second linear feedback shift register resides in a head-end at a cable television carrier.

28. The media device chip of claim 21 wherein said second key is mapped to a one time programmable identification word, wherein said second key is stored in a first database while said one time programmable identification word is stored in a second database.

29. The media device chip of claim 28 wherein said first database is stored in a first computing device while said second database is stored in a second computing device.

30. The media device chip of claim 22 wherein said constant is generated using one or more programmable parameters stored in said media device chip.

31. The media device chip of claim 30 wherein said one or more programmable parameters are stored in a head-end at a cable television carrier.

32. The media device chip of claim 31 wherein said constant may be modified by a media device chip manufacturer using said one or more programmable parameters.

33. The media device chip of claim 21 wherein said first generating employs 3DES encryption.

34. The media device chip of claim 21 wherein said first generating employs AES encryption.

35. The media device chip of claim 21 wherein said control signal is used for resetting a timer value stored within said media device chip.

36. The media device chip of claim 35 wherein said media device chip is disabled when said timer value reaches zero.

37. The media device chip of claim 35 wherein said control signal inhibits resetting of said timer value whenever said first hashed sequence is not equal to said second hashed sequence.

38. The media device chip of claim 21 wherein said control signal is used for modifying contents of a register to enable or disable said media device chip.

39. The media device chip of claim 21 wherein said control signal is used for synchronizing between said media device chip and a head-end.

40. The media device chip of claim 21 wherein said control signal is used to synchronize said second linear feedback shift register to the same state of said first linear feedback shift register.

41. A method comprising:
receiving a verification sequence by a media device;
generating an encryption key;
decrypting said verification sequence using said encryption key to generate a first hashed data sequence;
generating a second hashed data sequence; and
determining if said first hashed data sequence is equal to said second hashed data sequence, wherein each of said first and said second hashed data sequences is a function of an output from a linear feedback shift register.

42. The method of claim 41 further comprising resetting a timer, said timer disabling operation of said media device when a value provided by said timer decreases to zero.

43. The method of claim 42 wherein said resetting is performed when said media device receives said verification sequence comprising a timer reset sequence.

44. The method of claim 41 further comprising enabling said media device if said first hashed data sequence is equal to said second hashed data sequence.

45. The method of claim 41 wherein said second hashed data sequence is a hash function of one or more parameters stored in said media device, said parameters comprising:
a constant; and
said output from said linear feedback shift register.

46. The method of claim 45 wherein said constant may be modified only by a manufacturer of said media device.

47. The method of claim 45 wherein said output from said linear feedback shift register is stored in a non-volatile random access memory.

48. The method of claim 45 wherein said output of said linear feedback shift register is modified when a subsequent verification sequence is received.

49. The method of claim 45 wherein said output from said linear feedback shift register is mapped to an identifier word.

50. The method of claim 45 wherein both a head-end verification device and said media device store the same said constant and implement the same linear feedback shift register configuration to generate said first hashed data sequence and said second hashed data sequence, respectively.

51. The method of claim 45 wherein said linear feedback shift register is initialized using a seed.

52. The method of claim 45 further comprising transmitting a re-synchronization request to a head-end verification device in order to reactivate said media device.

53. The method of claim 52 wherein said re-synchronization request is triggered when said received verification sequence generates a first hashed data sequence that is not equal to said second hashed data sequence.

54. The method of claim 53 wherein said re-synchronization request comprises an output of a previous state of said linear feedback shift register.

55. The method of claim 52 wherein said re-synchronization request utilizes the output of the next state of said linear feedback shift register.

56. The method of claim 52 wherein said re-synchronization request utilizes the output of the next few states of said linear feedback shift register.

57. The method of claim 56 wherein said next few states correspond to the next two states.

58. The method of claim 56 wherein said next few states correspond to the next three states.

59. The method of claim 41 wherein said encryption key is a function of a key, a word, and said output from said linear feedback shift register.

60. The method of claim 59 wherein said key is mapped to an identifier word.

61. The method of claim 59 wherein said word is mapped to an identifier word.

62. The method of claim 59 wherein said word uniquely identifies said media device.

63. The method of claim 59 wherein said word comprises at least 64 bits.

64. The method of claim 41 wherein said first hashed sequence and said second hashed sequence are both functions of the same hash function.

65. The method of claim 41 wherein a function used to generate said encrypted key is used to generate said verification sequence.

66. The method of claim 41 further comprising initializing said linear feedback shift register using an initialization seed that is unique to said media device.

\* \* \* \* \*